(12) United States Patent
Larrochelle et al.

(10) Patent No.: US 8,573,848 B2
(45) Date of Patent: Nov. 5, 2013

(54) BALL SLIDE BEARING AND CONNECTING DEVICE ASSOCIATED WITH A MAST FOR HOOKING A GAS TURBINE ENGINE UNDER AN AIRCRAFT WING COMPRISING SUCH A BEARING

(75) Inventors: Jean Larrochelle, Toulouse (FR); François Peyruseigt, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 520 days.

(21) Appl. No.: 12/880,491

(22) Filed: Sep. 13, 2010

(65) Prior Publication Data
US 2011/0064343 A1    Mar. 17, 2011

(30) Foreign Application Priority Data
Sep. 14, 2009 (FR) ...................... 09 56295

(51) Int. Cl.
*B64D 27/12* (2006.01)
*F16C 23/04* (2006.01)
(52) U.S. Cl.
USPC .............. 384/208; 384/206; 244/54; 248/554
(58) Field of Classification Search
USPC ............. 384/206, 208, 209; 248/554; 244/54; 403/74, 122
IPC ....................................................... B64D 27/26
See application file for complete search history.

(56) References Cited

U.S. PATENT DOCUMENTS

| 1,825,293 | A | | 9/1931 | Derhoef |
| 3,006,587 | A | | 10/1961 | Jumelle et al. |
| 3,561,707 | A | * | 2/1971 | Strock ........................... 248/554 |
| 3,979,087 | A | * | 9/1976 | Boris et al. ...................... 244/54 |
| 5,265,965 | A | * | 11/1993 | Harris et al. ................... 384/208 |

FOREIGN PATENT DOCUMENTS

| DE | 4210685 C1 | 4/1993 | |
| EP | 2039949 A1 | 3/2009 | |
| WO | WO 9311041 A1 * | 6/1993 | ............ B64D 27/26 |
| WO | 2007131979 A1 | 11/2007 | |

OTHER PUBLICATIONS

International Search Report, dated Apr. 26, 2010, from corresponding French Application.

* cited by examiner

*Primary Examiner* — Thomas Diaz
(74) *Attorney, Agent, or Firm* — Young & Thompson

(57) ABSTRACT

A ball slide bearing (18) includes an inside ring (19) and an outside ring (21), whereby the inside ring (19) is provided with an essentially cylindrical inner surface (19A) and a spherical outer surface (19B), and whereby the outside ring (21) is provided with a cylindrical outer surface (21B) and a cylindrical inner surface (21A). The bearing (18) includes an intermediate ring (20) that is inserted between the outside ring (21) and the inside ring (19), whereby the intermediate ring is provided with a spherical inner surface (20A) that can work with the outer surface of the inside ring (19) to allow the rotation along the three axes of rotation and an outer surface that defines at least one curved sliding surface (20B) in a direction that can work with a corresponding inside sliding surface (21A) of the outside ring (21).

13 Claims, 3 Drawing Sheets

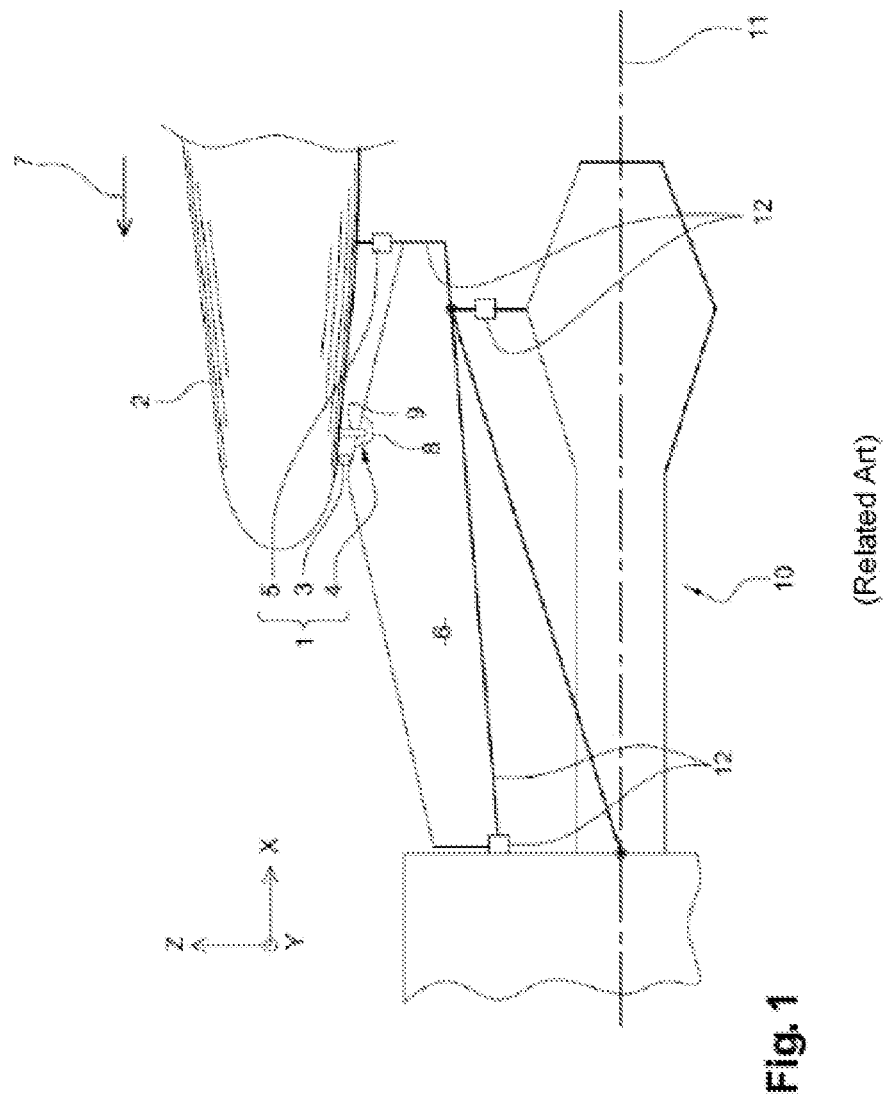

BALL SLIDE BEARING AND CONNECTING DEVICE ASSOCIATED WITH A MAST FOR HOOKING A GAS TURBINE ENGINE UNDER AN AIRCRAFT WING COMPRISING SUCH A BEARING

BACKGROUND OF THE INVENTION

1. Field of the Invention

This invention relates to a ball slide bearing and a connecting device associated with a mast for hooking a gas turbine engine under an aircraft wing comprising such a bearing.

2. Description of the Related Art

In the aeronautical industry, it is known to use a ball joint for immobilizing two elements, such as a connecting rod and a structural part, in translational movement relative to one another, while allowing a relative movement in rotation of these elements. Such a ball joint is used, for example, in a device for hooking a mast for hooking an aircraft gas turbine engine under a wing element.

On existing aircraft, the engines are suspended below the wing by a complex hooking device that is also called a hooking mast, comprising a rigid structure in the form of a box that consists of the assembly of longitudinal beams and panels connected to one another by several transversal ribs.

These devices are designed in particular for allowing the transmission to the wing of static and dynamic forces produced by the engines, such as weight, thrust, or else different dynamic forces.

In this connection, in the known hooking devices of the prior art, the transmission of these forces between the rigid structure and the wing is ensured by hooking means that consist of three fasteners, one front fastener that consists of two lateral half-fasteners, a rear fastener, as well as an intermediate fastener that is designed to absorb the thrust forces generated by the associated gas turbine engine.

Referring to FIG. 1, such a hooking device 1 of a gas turbine engine 10 for an aircraft according to the prior art is seen. To analyze the forces, an orthonormed reference point (OXYZ)—in which the OX axis represents the direction that is parallel to a longitudinal axis of this gas turbine engine 10, the OY axis represents the direction that is oriented crosswise relative to this gas turbine engine 10 and to the aircraft, and the OZ axis represents the vertical direction upward—is assigned to the gas turbine engine.

The terms "front" and "rear" are to be considered relative to a direction of advance of the aircraft that is shown diagrammatically by an arrow 7.

More specifically, this device comprises a rigid hooking structure 6 and a set of hooking means 1 inserted between the gas turbine engine 10 and a wing element 2. These hooking means 1 consist of a front fastener 3, an intermediate fastener 4 that is described in more detail below, and a rear fastener 5, whereby the intermediate fastener is placed between the front and rear fasteners.

Furthermore, in this FIG. 1, conventional hooking means 12 inserted between the rigid structure 6 and the gas turbine engine 10 are also shown by way of indication. These hooking means 12 are not part of this invention and consequently will not be described in more detail.

Referring to FIG. 1, it can be seen that the intermediate fastener that is designed to absorb the thrust forces, also called "spigot" fastener, comprises a ball joint 8 and a shaft 9, also called "spigot," housed in the ball joint. The ball joint and the shaft are attached by means of an attachment fitting to elements of boxes of mast and wing.

More specifically, the attachment fitting for attaching the shaft has an essentially flat support surface that is designed to be attached to the surface of the upper longitudinal beam of the box 6 using known mechanical attachment means. This fitting comprises an integrated shaft or a housing in which a shaft is connected, one or the other being oriented essentially parallel to the OZ axis. During the stowage of the mast, this shaft is housed in the ball joint that is installed in a wing element 2.

Now referring more specifically to FIG. 2A, it is possible to see that the ball joint consists of a set of elements accommodated in an opening that is made in another attachment fitting 13 of a type that is similar to the first. This second attachment fitting also has a flat support surface that is designed to be attached to a surface of the wing element using known attachment means. This unit comprises a first inside ring 15 that has a spherical surface arranged inside a second outside ring 16. The surface of the outside ring that is in contact with the inside surface of the opening of the fitting comprises sliding flat surfaces 31. These surfaces work with corresponding inside flat surfaces of the opening to make possible a movement along the longitudinal axis OX of the gas turbine engine. The two rings are kept within the opening by a tightening plate 14 that works with a brake washer 17. The movement of the axis within the inside ring ensures the movement along the OZ axis. Thus, the intermediate fastener 4 is designed so as to absorb the transverse forces directed in the direction OY.

A major problem in such a structural configuration of the ball joint comes from friction between the flat surfaces of the outside ring and the inside surface of the attachment fitting. Actually, the relative movements under load of the surfaces are accompanied by friction that generates phenomena of contact wear and tear and sliding at the level of the contact surfaces between the outside ring and the attachment fitting. In particular, there is a risk of roughness peaks that are present on the surfaces that rub under the action of contact wear and tear that weld together, which can, under high load, lead to complete locking or jamming of the ball joint. These wear and tear phenomena are all the more critical when the friction surfaces are flat due to the effects of free edges.

Furthermore, when such a problem occurs, it is necessary to change the fitting 13 and the outside ring 16. For this purpose, all of the parts that constitute the connection have to be removed. Since the fitting 13 is attached to a panel that is made of composite material, the fact of withdrawing attachment means and attaching a new fitting can make the composite structure fragile, which can lead to severe deterioration of the mechanical properties of the panel. Maintenance for changing damaged parts therefore proves difficult and expensive.

BRIEF SUMMARY OF THE INVENTION

It is these drawbacks that the invention more particularly intends to remedy by proposing a ball joint that behaves in a stable manner during operation and that has an improved service life, while facilitating the maintenance of the parts that constitute the ball joint.

For this purpose, the invention relates to a ball slide bearing comprising an inside ring and an outside ring, whereby said inside ring is provided with an essentially cylindrical inner surface and a spherical outer surface, whereby said outside ring is provided with cylindrical inner and outer surfaces.

According to the invention, said bearing comprises an intermediate ring that is inserted between the outside ring and the inside ring, whereby said intermediate ring is provided with a spherical inner surface that can work with the outer surface of the inside ring to allow rotation along the three axes of rotation and an outer surface that defines at least one sliding surface that has a curved profile in a direction that can work with a corresponding inside sliding surface of the outside ring.

Within the meaning of the invention, spherical surface is defined as a surface that is formed by at least one portion or segment of a sphere.

Owing to the presence of the intermediate ring, and in particular these sliding surfaces having a curved profile in one direction, the problem of wear and tear by friction of the outer surface of the outside ring of the prior art is eliminated by replacing the flat sliding surfaces by curved sliding surfaces, thus eliminating the effects of free edges.

According to one embodiment of the invention, this surface for sliding in one direction is defined by a circular profile.

According to another embodiment, this sliding surface in one direction is defined by an elliptical profile.

Advantageously, this intermediate ring is mounted in a removable manner in the outside ring. This outside ring also comprises a housing that is advantageously provided with at least one opening that passes through the cylindrical inner and outer surfaces of the outside ring, whereby the intermediate ring is accommodated in the housing by insertion via this opening. Preferably, this opening is an oblong-type hole.

Also, when the ball slide bearing is worn, maintenance is easier and faster than in the case of the ball joint of the prior art in which it is necessary to change the outside ring as well as the fitting in which the outside ring is accommodated.

The invention also relates to a connecting device associated with a mast for hooking a gas turbine engine for an aircraft under a wing element, whereby the hooking mast comprises a rigid structure in the form of a box, said device comprising an intermediate fastener that can absorb the forces that are transverse to the structure in the OY direction.

According to the invention, this fastener comprises a ball slide bearing as defined above, a shaft that is designed to be housed in the bearing, whereby said bearing and shaft are mounted respectively in an attachment fitting that is made integral with any of the elements taken from among said rigid structure in the form of a box and said wing element in the form of a box.

According to one embodiment of the invention, the direction of the outer sliding surface of the intermediate ring is parallel to the longitudinal axis of the gas turbine engine.

According to an advantageous embodiment of the invention, the attachment fitting comprises a housing in which the outside ring is accommodated. The outside ring then comprises a collar that is designed to rest against the periphery of the housing of the attachment fitting when the outside ring is installed in the housing, attachment means being arranged on the collar to make the outside ring integral in the housing. Thus, in this way, it is no longer necessary to use a brake washer or a tightening plate to keep the ball joint in the housing of the attachment fitting. This makes the assembly of the unit easier and faster.

According to one embodiment of the invention, the intermediate fastener is designed so as to absorb the transverse forces in the direction (OY) of the gas turbine engine.

Furthermore, in each of the embodiments of the invention, this connecting device also comprises a front fastener and a rear fastener, whereby the intermediate fastener is located between the latter.

BRIEF DESCRIPTION OF THE DRAWINGS

In different possible embodiments, the invention will be described in more detail with reference to the accompanying drawings in which:

FIG. 1 shows a side view of a connecting device for hooking a mast for hooking a gas turbine engine under a wing element;

DETAILED DESCRIPTION OF THE PREFERRED EMBODIMENTS

Figure 4:
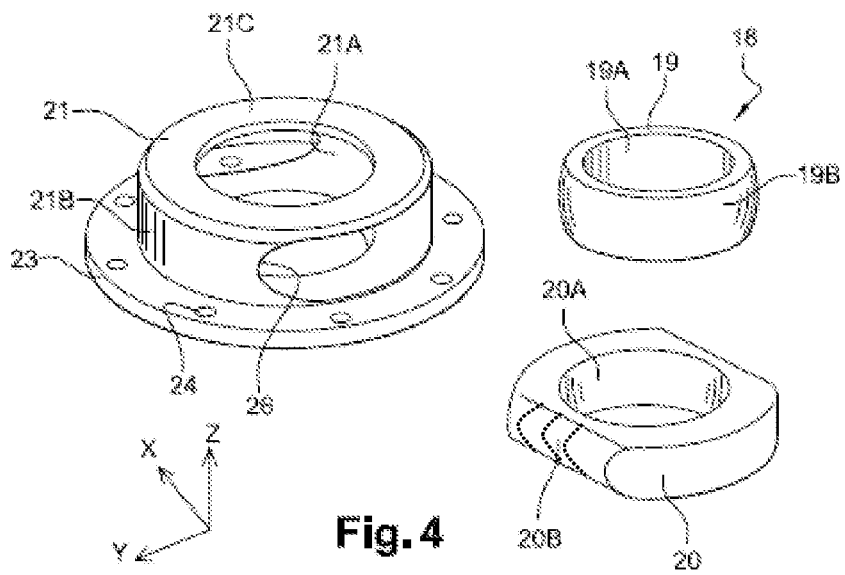
FIG. 4 shows an exploded perspective view of the ball slide bearing of FIG. 3A.

The ball slide bearing 18 according to the invention that is shown in FIG. 4 comprises an inside ring 19, an intermediate ring 20, and an outside ring 21.

Figure 2A:
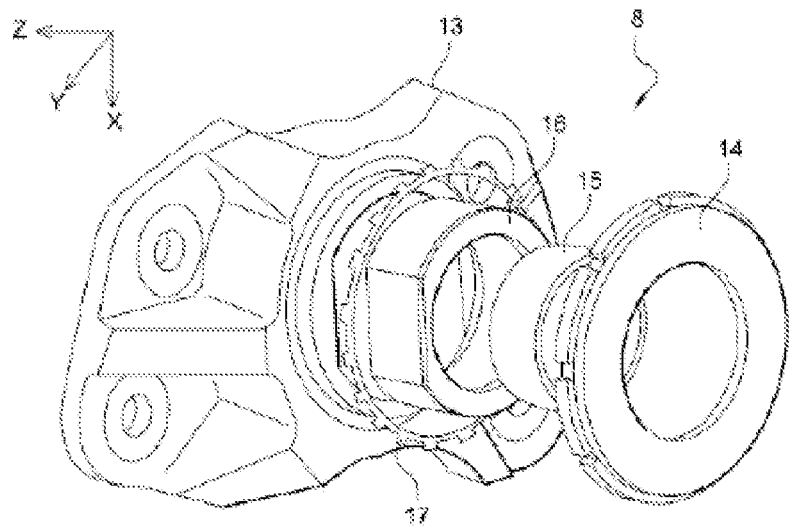
FIG. 2A diagrammatically shows an exploded perspective view of a set of parts constituting a slide bearing according to the prior art.
Figure 2B:
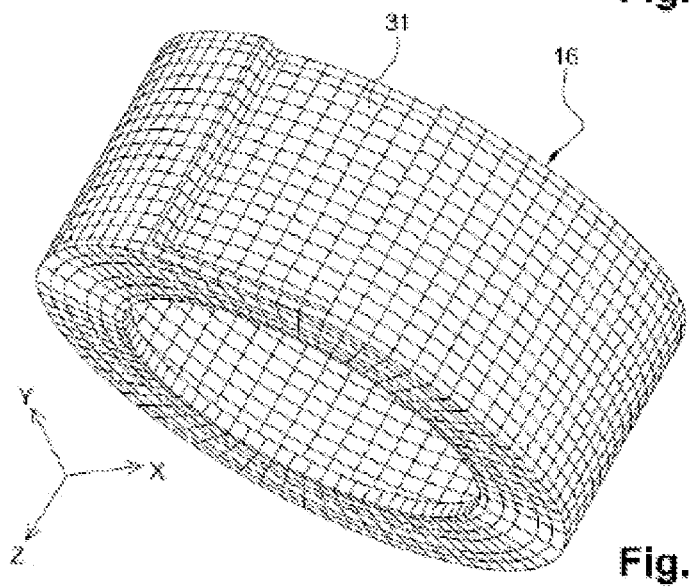
FIG. 2B shows a contact zone of the outside ring of the bearing.
Figures 3A, 3B:
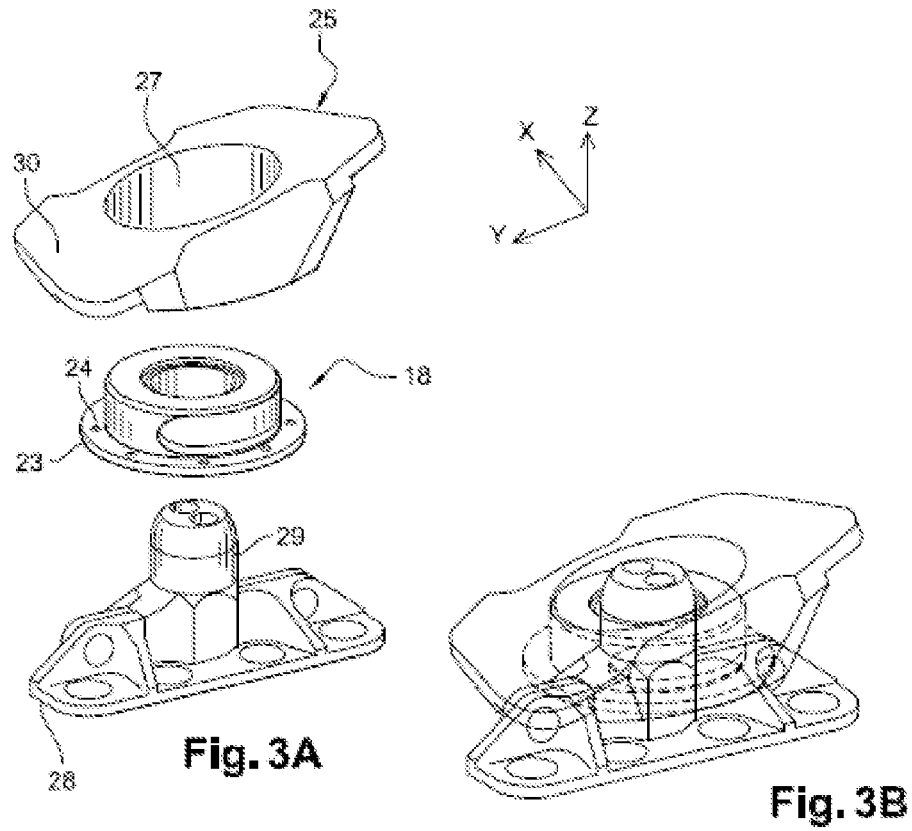
FIG. 3A diagrammatically shows an exploded perspective view of a set of parts comprising a ball slide bearing according to the invention that is designed to be installed in an attachment fitting and the index that is designed to be accommodated in the bearing.
FIG. 3B shows the set of assembled parts in position.

FIGS. 3A and 3B show this bearing being used as an articulation connection in the case of a device 1 for hooking a mast for hooking a gas turbine engine 10 for an aircraft under a wing element (FIG. 1). A connecting device generally comprises three fasteners inserted between the wing element and the hooking mast, respectively called front fasteners 3, intermediate fastener 4, and rear fastener 5.

An orthonormed reference point (OXYZ) is assigned to this bearing, in which the OX axis represents the direction that is parallel to a longitudinal axis of this gas turbine engine 10, the OY axis represents the direction that is oriented crosswise relative to this gas turbine engine 10 and to the aircraft, and the OZ axis represents the vertical direction upward.

The front and rear fasteners are similar to those encountered in the hooking device of the prior art. By contrast, the intermediate fastener is specific to this invention and will therefore be described in a detailed manner below. And more specifically, the ball slide bearing of this invention is applied in this intermediate fastener 4.

Such a ball-joint fastener is illustrated in 3A and 3B. This fastener 4 comprises an attachment fitting 25 that has an essentially flat support surface 30. This fitting 25 comprises a housing 27 in which a ball slide bearing 18 of this invention is accommodated. More specifically, this bearing, which has an overall shape of a ring, also comprises a collar 23 that is equipped with attachment holes 24. When the bearing is inserted into the housing of the fitting 25, the upper surface of this collar 23 comes to rest against the surface of the periphery of the housing 27. Known attachment means such as a screw and a nut are then arranged in the attachment holes of the collar to interlock the two parts. Thus, it should be understood that the mounting of the bearing in the fitting is made easier and faster than in the case of the bearing of the prior art. Actually, it is no longer necessary to use a washer and a tightening plate to keep the bearing in the housing of the fitting.

The fastener 4 also comprises an index 29, also called a shearing pin, which is oriented in a manner that is essentially parallel to the vertical direction Z and of which one end is housed in the ball joint. This index projects from the support surface of a second attachment fitting 28. Preferably, this index and this second fitting 28 form a single integral part. In one alternative form, this fitting 28 also comprises a housing in which one end of the index 29 is attached.

In one embodiment of the invention, the ball slide bearing 18 is attached to a wing element 2 by means of the attachment fitting 25, and the index is attached to an upper longitudinal beam of the rigid structure 6 of the hooking mast by means of the second fitting 28.

In another embodiment of the invention that is illustrated in FIG. 1, the ball slide bearing 18 is attached to the upper longitudinal beam of the rigid structure 6 of the mast, and the index 29 is attached to the wing element.

Now referring more specifically to FIG. 4, it is possible to see that the bearing 18 consists of three rings: an outside ring 21 that is designed to be housed in the housing of the fitting 25, an intermediate ring 20, and an inside ring 19.

The inside ring 19 comprises an inner surface 19A that is essentially cylindrical and is provided to be placed against the outside wall of the corresponding index 29, and an outer surface 19B that has a spherical profile, more specifically in a segment of a sphere. This outer surface 19B is able to work with the corresponding inner surface 20A of the intermediate ring 20. The inside ring 19 and the intermediate ring 20 thus have, one relative to the other, three degrees of freedom of rotation.

The outside ring 21 also comprises an essentially cylindrical outer surface 21B and an inner surface 21A, whereby the two surfaces are connected by side walls 21C. Thus, this ring comes in the form of a shouldered ring through which an oblong hole passes.

The intermediate ring 20 also comprises an outer surface 20B that is provided with a sliding surface that has a curved profile in one direction that is parallel here to the longitudinal axis (OX) of the gas turbine engine. This sliding surface 20B is designed to work with a corresponding inner surface 21A of the outside ring. A sliding surface in one direction is defined as a surface that allows a movement in the direction (OX). In contrast to the ball joint of the prior art that uses a flat sliding surface to allow this movement in the direction (OX), this invention proposes using a surface that has a curved profile to limit the effects of wear and tear by friction due to the effects of free edges. This profile can be circular or, preferably, elliptical. Actually, the elliptical profile makes it possible to reduce the dimensions as well as the weight of the ball slide bearing while ensuring the same performance levels.

The arrangement between the three rings is very simple and defined in the following manner. The inside ring 19 is accommodated in the hole of the intermediate ring 20 to form an entity that is then inserted in a housing 26 of the outside ring 21 that is provided for this purpose. More specifically, the cylindrical outer surface 21B and the cylindrical inner surface 21A of the outside ring 21 are passed through by an opening that forms an oblong-type hole 26 for this insertion. Thus, once the intermediate ring that comprises the inside ring is installed in the housing, it is completely enveloped by the walls of the housing of the outside ring. Preferably, the outside ring 21 is equipped with a ribbed profile to be installed in the housing 27 of fitting 25.

As is illustrated in FIG. 3B, it is possible to see that when the index 29 penetrates into the ball joint, one end of the index passes through the bearing and projects from the lateral surface 21C of the outside ring 21.

Using the particular structure of the ball slide bearing of this invention, it is possible to understand that the inside surface of the attachment fitting 25 is no longer advantageously subjected to contacts by friction with the outside surface of the ring, as was the case previously. This makes it possible to facilitate maintenance; actually, it is no longer necessary to change the attachment fitting that is fixed in a composite panel.

Another advantage imparted by this invention is the removability of the intermediate ring relative to the outside ring that also makes it possible to facilitate maintenance. Actually, the only thing required to remove the bearing from the housing of the fitting 25 is just to withdraw the attachment means placed on the collar 23 of the outside ring, and then to withdraw the intermediate ring from its housing to initiate a change of one of the three parts or to verify the state of the surfaces that are subjected to friction.

The invention claimed is:

1. A ball slide bearing, comprising:
an inside ring provided with an essentially cylindrical inner surface and a spherical outer surface;
an outside ring provided with a cylindrical outer surface and a cylindrical inner surface; and
an intermediate ring inserted between the outside ring and the inside ring, the intermediate ring being provided with a spherical inner surface that can operate with the outer surface of the inside ring to allow rotation along three axes of rotation, and
a circumferential outer surface that defines at least one curved sliding surface for only a portion of the circumferential outer surface, the at least one curved sliding surface being curved convexly with respect to the spherical inner surface and that can operate with and slidingly correspond with the cylindrical inner surface of the outside ring.

2. The bearing according to claim 1, wherein said sliding surface of the intermediate ring is defined by a circular profile.

3. The bearing according to claim 1, wherein said sliding surface of the intermediate ring is defined by an elliptical profile.

4. The bearing according to claim 1, wherein the intermediate ring is mounted in a removable manner in the outside ring.

5. The bearing according to claim 4, wherein the outside ring comprises a housing that is provided with at least one opening that is made on the outside surface of the outside ring, the intermediate ring being accommodated in the housing by insertion via the opening.

6. The bearing according to claim 5, wherein the outside surface of the outside ring is an outer radial surface, the at least one opening being formed through the outer radial surface of the outside ring.

7. A connecting device associated with a mast for hooking a gas turbine engine for an aircraft under a wing element, the hooking mast including a rigid structure, the connecting device comprising:
an intermediate fastener configured to absorb thrust forces generated by the gas turbine engine, the intermediate fastener comprising
a ball slide bearing defined according to claim 1, and
a shaft configured to be housed in the bearing, the bearing and the shaft being mounted respectively in an attachment fitting integrated with one or more of the rigid structure and the wing element.

8. The device according to claim 7, wherein a direction along which the outer sliding surface of the intermediate ring curves is parallel to a longitudinal axis of the gas turbine engine.

9. The device according to claim 8, wherein the attachment fitting comprises a housing in which the outside ring is accommodated.

10. The device according to claim 9, wherein the outside ring comprises a collar that is designed to rest against the periphery of the housing of the attachment fitting when the outside ring is installed in the housing, and attachment means are placed on the collar to interlock the outside ring in the housing.

11. The device according to claim 7, wherein the attachment fitting comprises a housing in which the outside ring is accommodated.

12. The device according to claim 11, wherein the outside ring comprises a collar that is designed to rest against the periphery of the housing of the attachment fitting when the outside ring is installed in the housing, and attachment means are placed on the collar to interlock the outside ring in the housing.

13. The device according to claim 7, wherein the intermediate fastener is designed to absorb forces that are exerted in a transverse direction of the gas turbine engine.

* * * * *